United States Patent [19]
Landerer et al.

[11] 3,735,789
[45] May 29, 1973

[54] REMOVABLE ANTI-SKID ARRANGEMENT FOR VEHICLE TIRES

[76] Inventors: Meinrad Landerer, Naus Nr.12, 8972 Tiefenbach; Anton Kuisle, 8971 Burgberg 172, both of Germany

[22] Filed: Dec. 16, 1970

[21] Appl. No.: 98,761

[52] U.S. Cl..................................152/217, 152/217
[51] Int. Cl............................................B60c 27/10
[58] Field of Search......................152/217, 218, 219

[56] References Cited
UNITED STATES PATENTS
2,990,868   7/1961   Sterle ..................................152/218
1,511,917   10/1924   Smith et al. ..........................152/219

Primary Examiner—James B. Marbert
Attorney—Waters, Roditi, Schwartz & Nissen

[57] ABSTRACT

The invention relates to a removable anti-skid arrangement for vehicles tires comprising, on opposite faces of the tire, a pair of releasably secured plates, each plate having a pair of arms, the free ends of said arms interconnected by a chain, and the chains interconnected by cross chains disposable over the treads of the tire.

7 Claims, 6 Drawing Figures

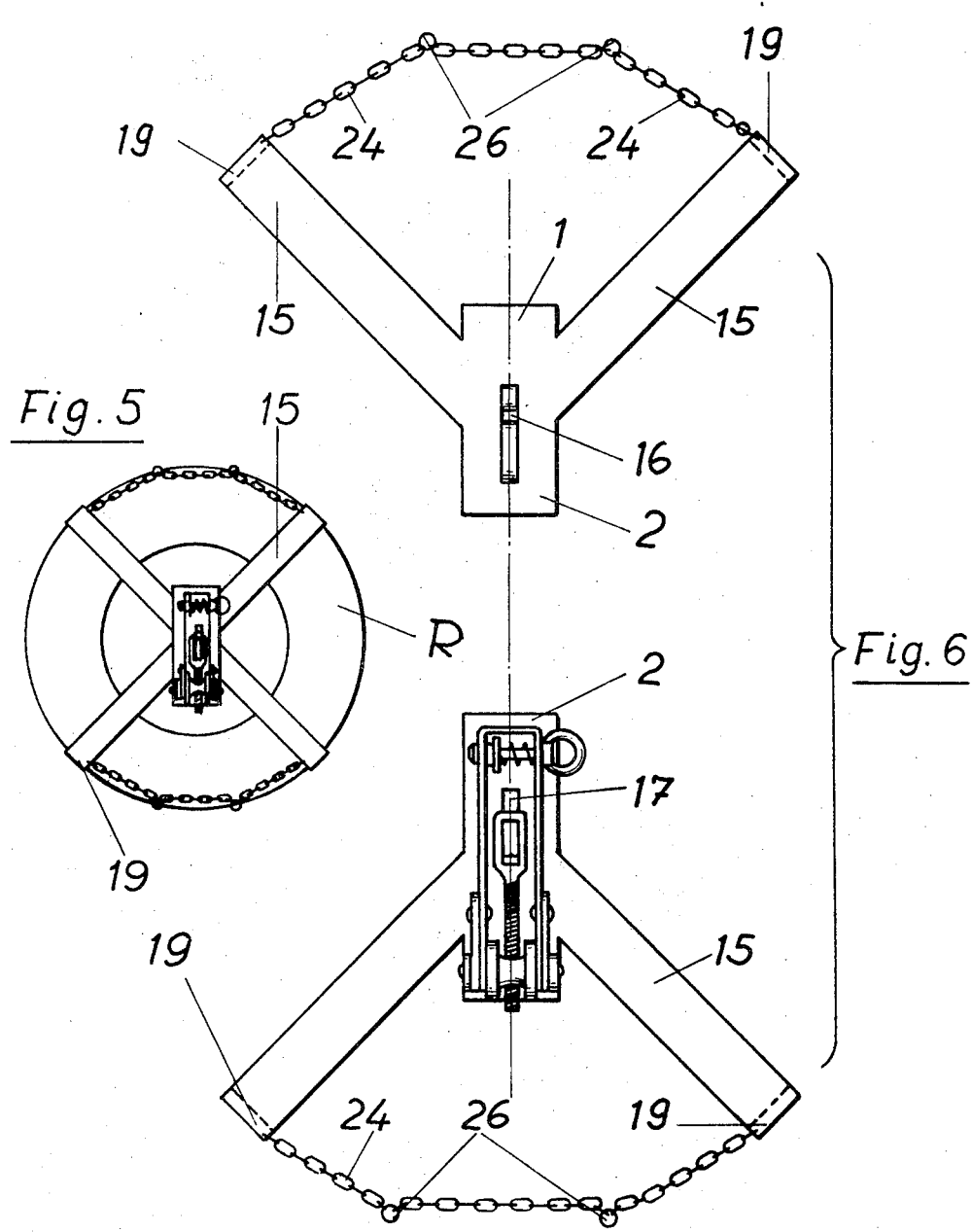

REMOVABLE ANTI-SKID ARRANGEMENT FOR VEHICLE TIRES

This invention relates to an anti-skid arrangement readily mountable on vehicle tires and the like.

The invention suggests two retaining plates detachably fastened together by a cranked-lever clamping fastener to lie flat against one another. Each retaining plate has at least two, diverging, rigid arms, each arm terminating in a bow which lies across the running surface of the tire. The arms are crossed and anti-skid elements are fastened to the bows of the two arms also mounted across the tire running surface.

The anti-skid arrangement can be conveniently fitted to motor vehicle wheels which are already stuck, with little effort and in an extremely short time. An essential feature is that the arms are fastened rigidly to the retaining plates, thus producing two rigid interconnected components mounted on opposite faces of the wheel by clamp fasteners which, according to the invention, are constructed as cranked-lever clamps.

An essential feature of the invention is that cranked-lever clamp attached to a retaining plate which has, in front of the clamp, a guiding slot disposed in the longitudinal direction and is penetrated by a central tongue on the lower retaining plate. The lower plate is provided with a recess which is constructed in the form of a slit which extends in the longitudinal direction and in which a loop on the clamp engages. The height of the slit and the thickness of the loop are selected in such a way that the two plates touch one another in the clamped condition. According to the invention, the clamp itself is constructed in such a way that a cranked lever is pivotably mounted on the upper retaining plate at a distance from the latter and has an articulated connection with a clamping lever, which connection is provided at a distance from that lower end of the pivoting lever to which the loop is attached.

The clamping arrangement according to the invention is adjustable to accommodate varying wheel diameters. Thus, by shifting a single clamping lever, the two parts of the anti-skid arrangement are fastened and clamped to one another, and an additional locking arrangement is provided at the outer end of the clamping lever, in order to prevent the unintentional release of the clamping device.

The invention will be described, by way of example, with reference to the drawing, in which:

FIG. 5 is a side view of the anti-skid arrangement fitted to the wheel of a vehicle, and FIG. 6 is a detailed view of the two parts of the anti-skid arrangement which are to be joined together.

Figure 1:
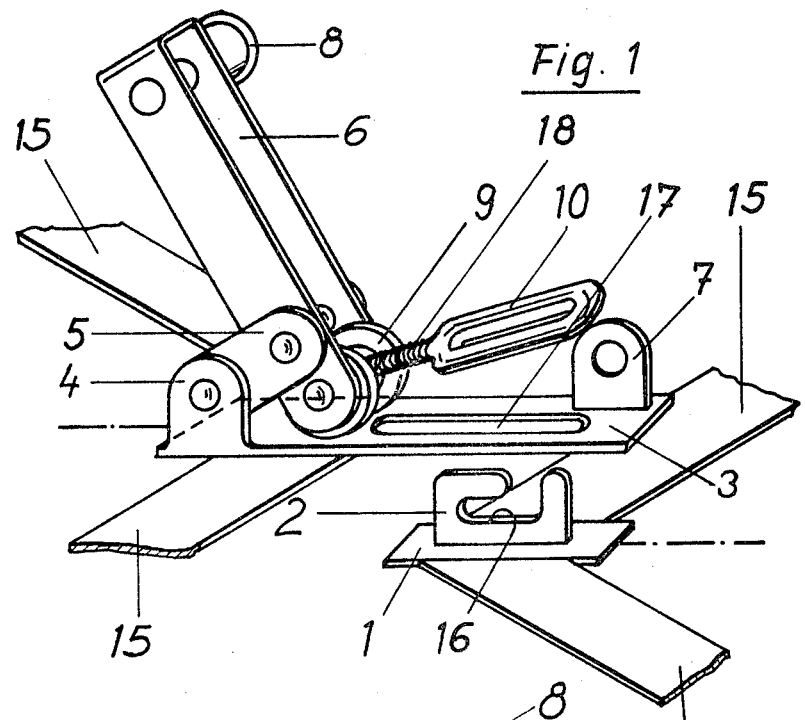
FIGS. 1-3 are perspective views of two parts of the anti-skid arrangement in progressive stages of assembly.
Figure 2:
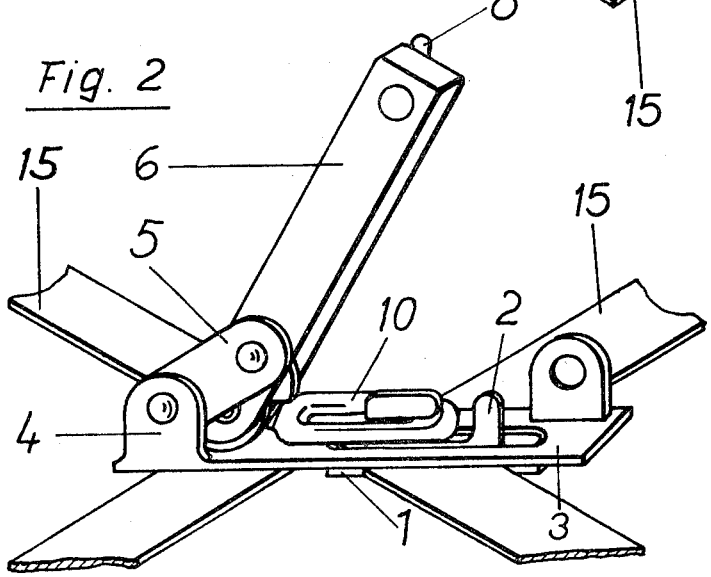
Figure 3:
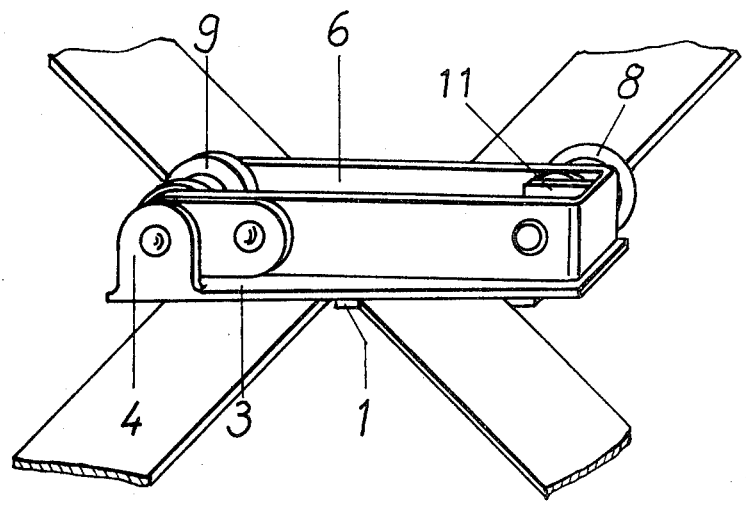
Figure 4:
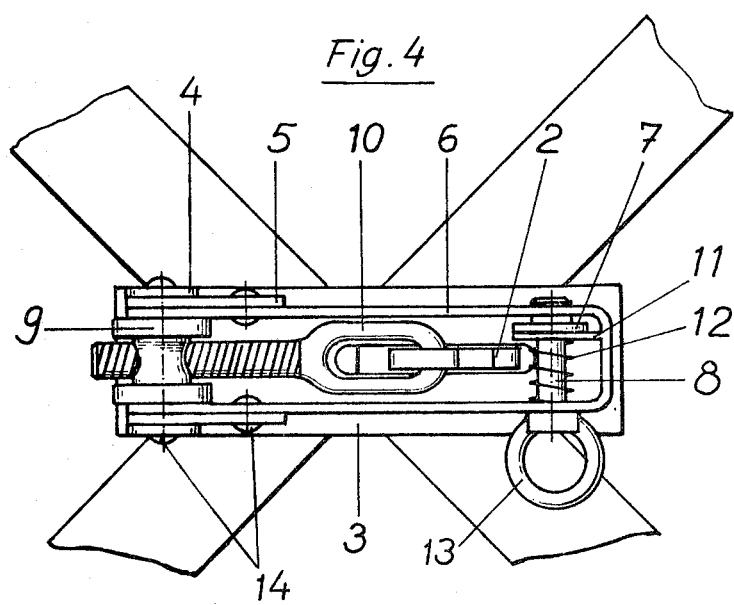
FIG. 4 is a plan view of the device clamped and locked.

The clamping device shown in FIGS. 1-4 is constructed in the following way. A flat lower plate 1 and an upper plate 3 each have two diverging arms 15 which lie in the same plane as their respective plate and the purpose of which will be described later. A tongue 2, which has an angled slit 16, projects upwardly from the lower plate 1. In its central longitudinal plane, the upper plate 3 has a guiding slot 17, of which the width is approximately the same as that of the tongue 2, although its length is considerably greater than that of the tongue 2.

In order to fasten the two plates 1 and 3 together, the tongue 2 is guided through the slot 17 until the two plates 1 and 3 are juxtaposed. A pivoted loop or locking means 10 is then hooked into the slip 16 (FIG. 2) and a clamping lever 6 pivoted in the clockwise direction of rotation, about an articulated linkage connection with two cranked levers 5 which are, in turn, pivotably arranged on two lugs 4 on the upper retaining plate 3. The clamping lever 6, which is of U-shaped construction, lies on the upper retaining plate 3 and is locked in this position by a spring loaded locking arrangement comprising locking pin 8 with a spring 12 and a handle 13. The pin 8 passes through a pair of holes in the clamping lever 6 and a hole aligned with the said pair of holes. A lug or a perpendicular projection 7 is provided at the right-hand end (FIGS. 1-4) of the upper plate 3. A washer 11 fastened to the pin serves as an abutment for the spring 12.

At the free ends of the shanks of the U-shaped clamping lever 6 there is provided a transverse member 9 freely supported, between the levers 5, 3. The center of this transverse 9 is drilled and may have a thread for adjustably receiving threaded rod 18 which mounts loop 10. Alternatively, however, the rod 18 may simply be passed through an ordinary hole and be secured at its end by a nut and, if necessary, a lock-nut.

It is important in respect of the construction, that the upper plate 3 should have lugs 4 at the upper ends of which are pivotably mounted, inside the lugs in each case, two cranked-levers 5. The free ends of the levers 5 are pivotably secured to the U-shaped clamping lever 6. This linkage carries the transverse member 9.

In the Figures, the slit 11 is shown parallel to the lower plate 1. An alternative construction consists in the fact that at least the upper limiting edge of this slit 16 extends in a convergent manner relative to the plate 1, towards the left, as seen in the drawing, and therefore in the clamping direction with the result that the two plates 1 and 3 are moved both parallel to, and towards, one another during the clamping operation.

FIGS. 5 and 6 show a diagrammatic, overall assembled view of the invention on one face of a vehicle tire. A second assembly is mounted on the opposite face. It can be seen the ends of the arms 15 are constructed as bows 19 which lie on the running surface of tire R and are bent radially inwards on the rear side of the tire, with the result that the cross formed by the arms cannot be removed towards the front when the fastener is in the clamped condition. The bows 19 of the two arms 15 of each part are joined by anti-skid elements, in this case chain members 24. A plurality of cross connecting chain members 26 interconnect with a chain member 24 on the assembly on the opposite face of the tire. The chains 26 are disposed over the thread of tire to promote traction and to prevent skid.

It should be appreciated that by adjusting the position of the loop 10 on threaded member 18, the spacing of the free ends of the arms 15 on the plates 1 and 3 can be varied to accommodate wheels of differing diameters.

What is claimed is:

1. An anti-skid device to be mounted on a tire of a motor vehicle, comprising a pair of mounting plates detachably arranged in a juxtaposed relation to each other, each plate having two diverging arms, anti-skid means connected to said arms for mounting on the running surface of the tire, said plates including a first plate having a guiding slot and a second plate including a tongue for passing through said slot in the juxtaposed relation of the plates, and means for detachably locking said plates together and for retaining said anti-skid means upon the tire, said locking means including an adjustable loop member and a clamping member pivotally mounted on said first plate, said tongue having a recess therein, engageable with said loop member for holding said plates in the juxtaposed relation, wherein said loop member is axially adjustable and includes a head having an elongated opening and an elongated threaded shank connected to said head, said first plate including two upwardly spaced lugs at one end thereof, a pair of levers pivotally connected to said lugs, said clamping member including a U-shaped member having end portions thereof articulated to said levers, and a transverse member freely mounted between said levers, having a threaded opening therein, said threaded shank being disposed in said opening, whereby upon rotation of said head, said threaded shank moves with said head in relation to the position of said tongue, which position is variable in accordance with different wheel diameters.

2. The device as defined in claim 1, wherein said recess is formed by a slit, an upper edge of which extends from the forward end towards the rear end of said tongue in the longitudinal direction of said second plate.

3. The device as defined in claim 2, wherein said loop member contacts an upper edge of said recess and is at a distance from said second plate, which distance is substantially equal to the thickness of said first plate, whereby said plates touch one another in the operative position of said clamping member.

4. The device as defined in claim 1 wherein said recess has an upper edge extended obliquely towards said second plate in the clamping direction of said plates.

5. The device as defined in claim 1, further comprising an additional locking means at the outer end of said clamping member for preventing unintentional release of said loop member.

6. The device as defined in claim 5, wherein said additional locking means comprises a perpendicular projection having a first hole, provided at the opposite end of said first plate, said U-shaped member including a pair of holes at the outer end thereof, said first hole and said pair of holes being alignable in the clamping position of said plates, and a locking pin carried by said U-shaped member inserted in said holes for preventing unintentional release of said head from said projection.

7. The device as defined in claim 6 wherein said locking pin is provided with an abutment plate at an intermediate portion thereof, and spring means carried on said locking pin interposed between said abutment plate and a wall of said U-shaped member for biasing said locking pin towards its locking position.

* * * * *